(12) United States Patent
Tan

(10) Patent No.: US 7,852,611 B2
(45) Date of Patent: Dec. 14, 2010

(54) HIGH CAPACITANCE FILM CAPACITOR SYSTEM AND METHOD FOR MANUFACTURING THE SAME

(75) Inventor: Daniel Qi Tan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 464 days.

(21) Appl. No.: 11/958,678

(22) Filed: Dec. 18, 2007

(65) Prior Publication Data

US 2009/0154057 A1 Jun. 18, 2009

(51) Int. Cl.
*H01G 4/06* (2006.01)
(52) U.S. Cl. .............. 361/313; 361/311; 361/312; 361/301.4; 361/321.1; 361/321.2
(58) Field of Classification Search ........... 361/313, 361/311–312, 303–305, 509–512, 502–504, 361/523–528, 301.4, 321.1, 321.2, 306.1, 361/306.3
See application file for complete search history.

(56) References Cited

U.S. PATENT DOCUMENTS

| | | | | |
|---|---|---|---|---|
| 3,619,743 A | * | 11/1971 | Ferrante | .................. 361/303 |
| 4,490,774 A | | 12/1984 | Olson et al. | |
| 5,258,886 A | * | 11/1993 | Murayama et al. | ....... 361/321.5 |
| 5,490,035 A | | 2/1996 | Yen et al. | |
| 5,659,457 A | | 8/1997 | Lian et al. | |
| 6,721,168 B2 | * | 4/2004 | Takeuchi et al. | ............ 361/502 |
| 6,864,147 B1 | | 3/2005 | Fife et al. | |
| 7,057,881 B2 | * | 6/2006 | Chow et al. | .................. 361/508 |
| 7,466,539 B2 | * | 12/2008 | Dementiev et al. | .......... 361/502 |
| 7,612,985 B2 | * | 11/2009 | Dementiev et al. | .......... 361/502 |
| 2005/0083635 A1 | | 4/2005 | Ooma et al. | |
| 2007/0108490 A1 | | 5/2007 | Tan et al. | |
| 2007/0242417 A1 | | 10/2007 | Mosley et al. | |

FOREIGN PATENT DOCUMENTS

| | | |
|---|---|---|
| EP | 0437857 | 7/1991 |
| GB | 960562 | 6/1964 |
| GB | 1052279 | 12/1966 |
| JP | 05251265 | 9/1993 |
| JP | 11340091 | 12/1999 |
| JP | 2002190426 | 7/2002 |

OTHER PUBLICATIONS

EP08170275 Search Report, Mar. 27, 2009.
JP05251265 Abstract, Sep. 28, 1993.
JP11340091 Abstract, Dec. 10, 1999.
JP2002190426 Abstract, Jul. 5, 2002.

* cited by examiner

*Primary Examiner*—Nguyen T Ha
(74) *Attorney, Agent, or Firm*—Ann M. Agosti

(57) ABSTRACT

A film capacitor including a pair of electrodes having multiple pores is provided. The film capacitor includes a polymer film deposited upon each of the pair of electrodes to form a dielectric layer.

16 Claims, 3 Drawing Sheets

HIGH CAPACITANCE FILM CAPACITOR SYSTEM AND METHOD FOR MANUFACTURING THE SAME

BACKGROUND

The invention relates generally to film capacitors, and more particularly, to high capacitance film capacitors.

Over the last decade, significant increases in capacitor reliability have been achieved through a combination of advanced manufacturing techniques and new materials. Film capacitors can be classified into three types based on the manufacturing technology, namely, film and foil capacitors, metallized film capacitors and mixed technology film capacitors.

Generally, film and foil capacitors consist of two metal foil electrodes separated by a layer of plastic film. One of the commonly used plastic films is polypropylene. Typically, a film and foil capacitor is made by alternating two pieces of aluminum foil with two layers of plastic film. These interleaved layers are wound around a spindle in a manner that prevents the metal layers from touching each other. The film and foil capacitors have been widely used in high power and utility industry due to high current handling capability. Metallized film capacitors differ from the film and foil capacitors in the sense that the aluminum foils are replaced by a layer of metal film that is vacuum deposited onto the layer of plastic film. The metal film layer is typically extremely thin, in the order of about 50-500 angstroms and is typically aluminum or zinc. The metallized capacitor has the advantages of fail-safe characteristic, low equivalent series resistance, size, simplicity, and cost of manufacturing. Mixed technology capacitors are a combination of both film and foil capacitors, and metallized film capacitors. Typically, these are high voltage capacitors.

While significant improvements have been made in capacitors in the past few decades, certain issues continue to exist, for example low surface area and restriction in thickness of film that leads to a low capacitance. Therefore, it would be desirable to design a film capacitor that would address the aforementioned problems and meet the current demands of industry applications.

BRIEF DESCRIPTION

In accordance with an embodiment of the invention, a film capacitor is provided. The film capacitor includes a pair of electrodes including multiple pores. The film capacitor also includes a polymer film deposited upon each of the pair of electrodes to form a dielectric layer.

In accordance with another embodiment of the invention, a method of manufacturing a film capacitor is provided. The method includes disposing a pair of electrodes. The method also includes forming multiple pores on each of the pair of electrodes. The method further includes applying a coating of a polymer film on each of the pair of electrodes.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a film capacitor with improved electrical properties and operable at high voltages. A method of manufacturing such a film capacitor is also described. Some of the dielectric properties considered herein are dielectric constant, and breakdown voltage. The "dielectric constant" of a dielectric is a ratio of capacitance of a capacitor, in which the space between and around the electrodes is filled with the dielectric, to the capacitance of the same configuration of electrodes in a vacuum. As used herein, "breakdown voltage" refers to a measure of dielectric breakdown resistance of a dielectric material under an applied AC or DC voltage. The applied voltage prior to breakdown is divided by thickness of the dielectric material to give the breakdown voltage. It is generally measured in units of potential difference over units of length, such as kilovolts per millimeter (kV/mm). As used herein, the term 'high voltages' refers to operating voltages of at least about 200 V. Further, the term 'high capacitance' refers to capacitance of the order of μF.

Figure 1:
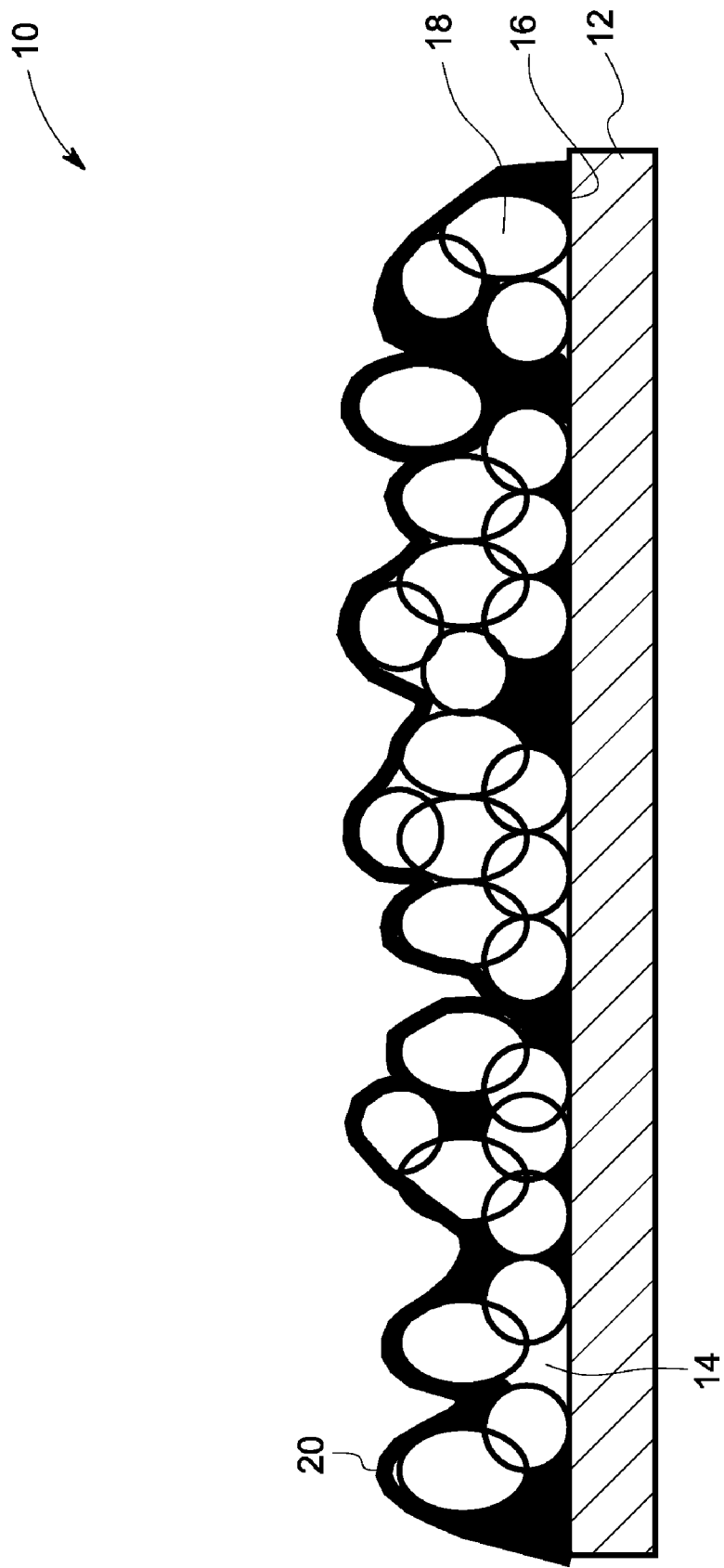
FIG. 1 is a cross-sectional diagram of a film foil capacitor system including a polymer film and a porous electrode in accordance with an embodiment of the invention.

FIG. 1 is a cross-sectional view of a portion of a film-foil capacitor 10 including an electrode 12, for example a cathode, having multiple pores 14. In a particular embodiment, the electrode comprises aluminum, copper, stainless steel, tantalum and titanium foils. In another embodiment, the pores 14 are indented on a porous surface 18 on the electrode 12. In yet another embodiment, the pores 14 are formed by multiple porous carbon particles or other nano metal particles including silver, copper, zinc, titanium, tungsten, titanium carbide and titanium nitride 18 disposed on the electrode 12. In another embodiment, the pores 14 include a spacing of less than about 1000 nm. Non-limiting examples of the porous carbon particles 18 include carbon black, activated carbon, carbon nanotube and trimetasphere carbon fullerene spheres. A polymer film 20 is further disposed upon the electrode 12 to form a dielectric layer. The polymer film 20 typically comprises an organic polymer, an inorganic material or a polymer film. A non-limiting example of an inorganic material is boron nitride (BN), mica, aluminum oxide, silicon oxide, silicon nitride ($Si_3N_4$) or aluminum nitride (AlN). Some non-limiting examples of the polymer film 20 include polypropylene (PP), polyester (PET), polyphenylene sulfide (PPS), polycarbonate (PC), fluorenyl polyester (FPE), polyetheretherketon (PEEK), polyethersulfone (PES), polyvinylidene fluoride (PVDF), polyvinylidene fluoride-trifluoroethylene (PVDF-TrFE), polyvinylidene fluoride-hexafluoropropylene (PVDF-HFP), polyethylene oxide (PEO), polypropylene oxide (PPO), polymethyl methacrylate (PMMA), polyimide, polyamide-imide, teflon (polytetrafluoroethelyne) (PTFE), Ultem® (polyetherimide) and combinations thereof. In another embodiment, the polymer film includes at least one polymer selected from a group consisting of cyanoresin, cellulose, acetate, acrylate, and polyvinyldifluoride.

In a particular embodiment, the polymer film includes a thickness of at most about 1 μm. In an example, the film-foil capacitor includes a capacitance of at least about 100 μF. The polymer film 20 forming a dielectric layer may operate in a temperature range between about −50° C. to about 200° C. A DC breakdown voltage of the dielectric layer may be in a range between about 200-600 kV/mm.

Figure 2:
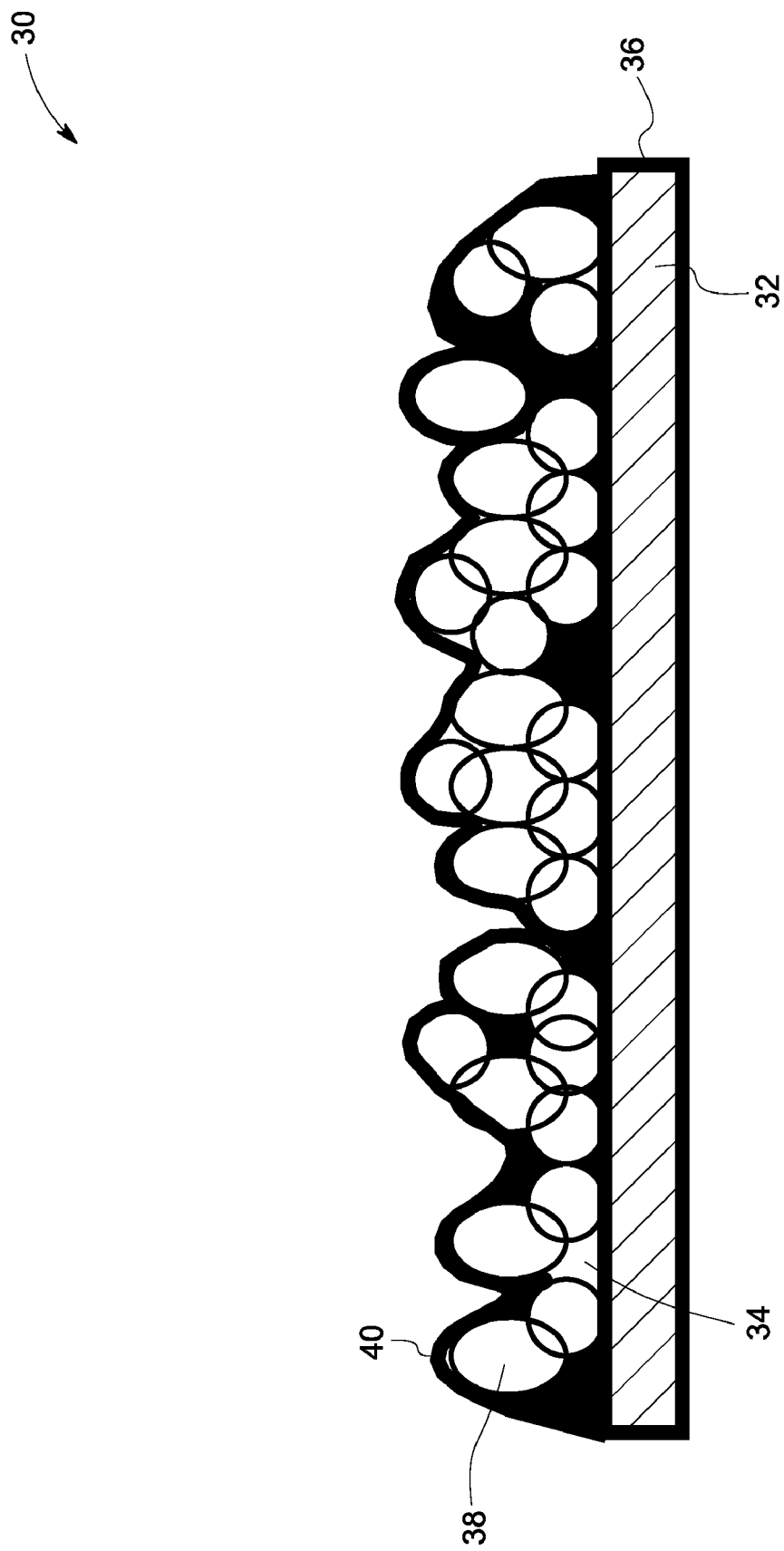
FIG. 2 is a cross-sectional diagram of a metallized film capacitor including a polymer film and a porous electrode in accordance with an embodiment of the invention.

FIG. 2 is a cross-sectional view of a portion of a metallized film capacitor 30 including a electrode 32, for example a cathode, having multiple pores 34. A metallized coating 36 is deposited on the electrode 32. In a particular embodiment, the electrode 32 comprises a double sided metalli7ed polymer film, such as, but not limited to, polypropylene (PP), polyester (PET), polyphenylene sulfide (PPS), polyetheretherketon (PEEK), polyvinylidene fluoride (PVDF), polyvinylidene fluoride-trifluoroethylene (PVDF-TrFE), polyvinylidene fluoride-hexafluoropropylene PVDF-HFP, Ultem® (polyetherimide) and Kapton® (polyimide). In another embodiment, the pores 34 are formed by multiple porous carbon particles 38 disposed on the electrode 32. Non-limiting examples of the porous carbon particles 38 include carbon black, activated carbon, carbon nanotube and trimetasphere carbon fullerene spheres. Some non-limiting examples of the activated carbon include particles, fibers, powder, sheet, cloth and felt. In another embodiment, the pores 14 include a spacing of less than about 1000 nm. A polymer film 40 is further disposed upon the electrode 32 to form a dielectric layer. In one embodiment, the polymer film includes at least one polymer selected from a group consisting of cyanoresin, cellulose, acetate, acrylate, and polyvinyldifluoride. In a particular embodiment, the polymer film includes a thickness of at most about 1 µm. In an example, the film-foil capacitor includes a capacitance of at least about 100 F. The polymer film 40 forming a dielectric layer may operate in a temperature range between about −50° C. to about 200° C. Breakdown voltage of the dielectric layer may be in a range between about 200-600 kV/mm. The typical thickness of the metallized coating 36 varies in the range of about 50 Å to about 500 Å.

Figure 3:
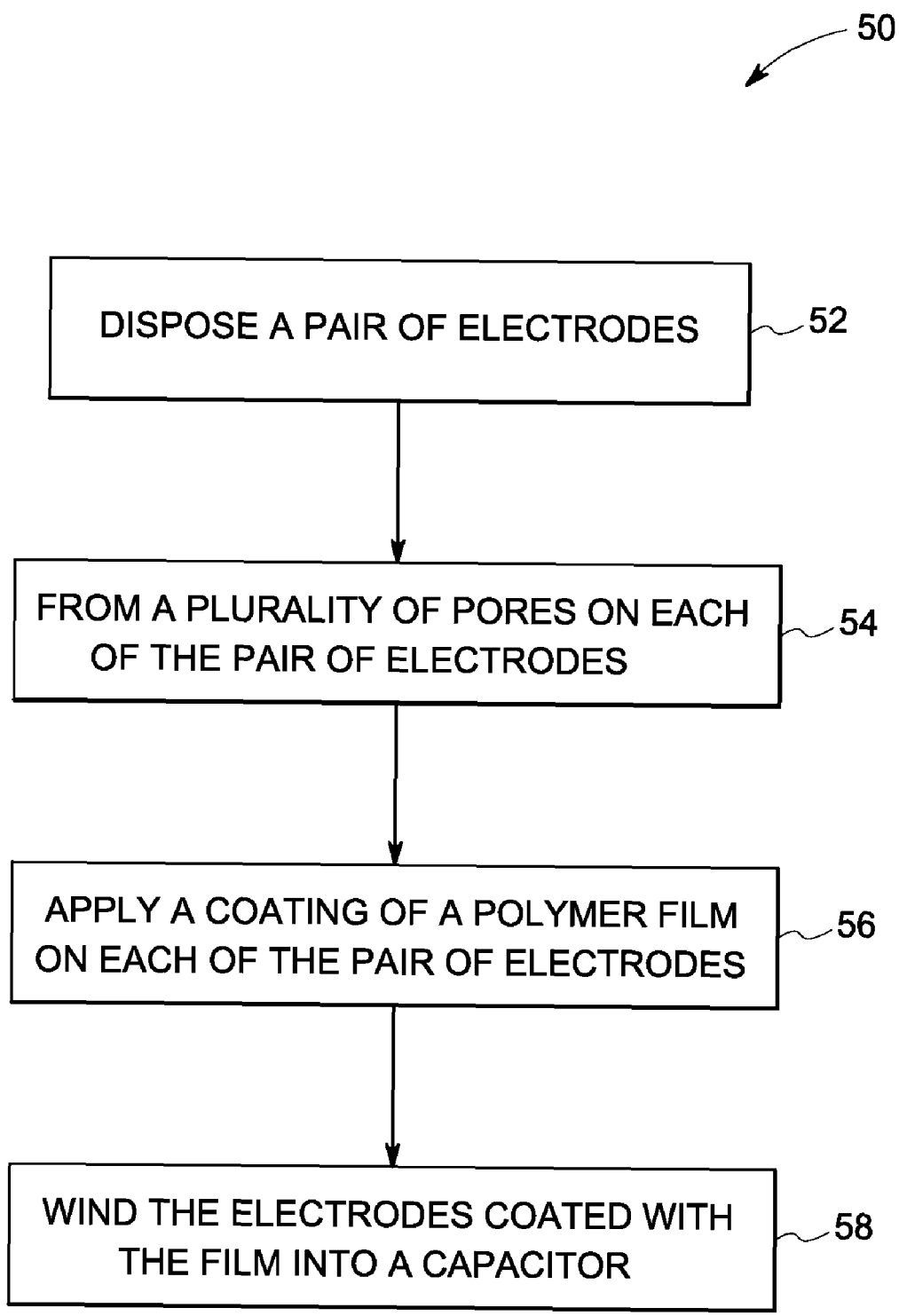
FIG. 3 is a flow chart representing steps in an exemplary method for manufacturing a capacitor system in accordance with an embodiment of the invention.

FIG. 3 is a flow chart representing steps in an exemplary method 50 for manufacturing a film capacitor. The method 50 includes disposing a pair of electrodes in step 52. Multiple pores are formed on each of the pair of electrodes in step 54. In a particular embodiment, the pores are formed via disposition of the pair of electrodes indented with a porous surface. In another embodiment, the pores are formed by pasting multiple porous carbon particles such as, but not limited to, activated carbon, carbon black, carbon nanotubes, or trimetasphere carbon fullerene spheres on each of the pair of electrodes. A coating of a polymer film is applied on each of the pair of electrodes in step 56. In an exemplary embodiment, the coating of the polymer film is applied via an electrophoresis technique, for example dip coating. Further, the pair of electrodes is optionally impregnated with oil to avoid arcing and partial discharge in a gap between electrodes. The electrodes coated with the polymer film are wound into a capacitor in step 58.

The dielectric layer of the present invention may be deposited in several ways. These include spin coating, dip coating, brush painting, solvent casting, and chemical vapor deposition. In one embodiment, a solution based cyanoresin polymer is deposited onto the porous electrodes via dip coating. Once the solution is dried out, the cyanoresin film remains to follow a tortuous morphology of the porous electrode structure. The tortuous morphology provides a high surface area resulting in an increased capacitance, small thickness, and high breakdown strength. Moreover, the porous electrode carried cyanoresin film avoids brittleness issue of the film and enables successful capacitor winding. Further, polymers such as cyanoresin film have been found to show a higher breakdown strength and dielectric constant.

The aforementioned embodiments present clear advantages over existing film capacitors and methods for making such capacitors. For example, it has been found the capacitors made by the foregoing techniques offer increased capacitance compared to existing film capacitors, increased operating current, increased surface area, increased thermal stability, and extended life. Moreover, the embodiments provide a combined advantage of high capacitance, high operating voltage, small volume and high energy density in a single capacitor design. Further, the aforementioned film capacitor may replace electrolytic capacitors and ultracapacitors in energy storage and filtering applications at a higher frequency and offer improved power electronic design. The aforementioned electrode configuration also enables brittle dielectric films and nanocomposite films to be deposited and wound into capacitors.

The various embodiments of an improved film capacitor design and a method described above thus provide a way to provide a film capacitor with high operating voltages as well as high capacitance of the order of mF. The ability to implant electroactive species within a polymer matrix allows a greater usage of available surface area of an electrode, thus increasing the capacitance.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an electrode deposited with porous carbon particles with respect to one embodiment can be adapted for use with a solution based polyvinylidene fluoride polymer described with respect to another. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An electrostatic film capacitor comprising:
   a pair of electrodes each comprising a plurality of pores defining a tortuous morphology; and
   a polymer film deposited upon each of the pair of electrodes to form a tortuous dielectric layer, wherein the polymer film comprises a thickness of at most about 1 µm and follows the tortuous morphology of each of the pair of electrodes.

2. The film capacitor of claim 1, wherein each of the pair of electrodes comprises at least one element selected from a group consisting of aluminum, tantalum, copper, stainless steel, titanium, or a metallized polymer film (40).

3. The film capacitor of claim 2, wherein the metallized polymer film (40) comprises polypropylene, polyester, polyphenylene sulfide, polyetheretherketon, polyvinylidene fluoride, polyvinylidene fluoride-trifluoroethylene, polyvinylidene fluoride-hexafluoropropylene, polyetherimide and polyimide.

4. The film capacitor of claim 1, wherein the pores are formed by a porous surface on each of the pair of electrodes.

5. The film capacitor system of claim 1, wherein the pores are formed by a plurality of porous carbon particles disposed on the electrodes.

6. The film capacitor of claim 1, wherein the porous carbon particles comprise carbon black, activated carbon, carbon nanotube and trimetasphere carbon fullerene spheres.

7. The film capacitor of claim 1, wherein the polymer film comprises at least one polymer selected from a group consisting of cyanoresin, cellulose, acetate, acrylate, and polyvinyldifluoride.

8. The film capacitor of claim 1, wherein the pores comprise a spacing of less than about 1000 nm.

9. The film capacitor of claim 1, the system comprising a capacitance of at least about 100 µF.

10. A method of manufacturing a an electrostatic film capacitor comprising:
    disposing a pair of electrodes;
    forming a plurality of pores on each of the pair of electrodes, the plurality of pores defining a tortuous morphology;
    applying a coating of a polymer film on each of the pair of electrodes to form a tortuous dielectric layer, wherein the coating of a polymer film comprises a thickness of at most about 1 µm and follows the tortuous morphology of each of the pair of electrodes; and
    winding the electrodes coated with the polymer film into a capacitor.

11. The method of claim 10, wherein forming the plurality of pores comprises disposing the pair of electrodes indented with a porous surface.

12. The method of claim 10, wherein forming the plurality of pores comprises pasting a plurality of porous carbon particles on each of the pair of electrodes.

13. The method of claim 12, wherein pasting the plurality of porous carbon particles comprises pasting at least one of a plurality of carbon nanotubes, activated carbon, carbon black, or trimetasphere carbon fullerene spheres on the pair of electrodes.

14. The method of claim 10, wherein applying the coating of the polymer film comprises applying the coating via an electrophoresis technique.

15. The method of claim 14, wherein the electrophoresis technique comprises dip coating.

16. The method of claim 10, further comprising impregnating the pair of electrodes with oil to avoid arcing between the electrodes.

* * * * *

UNITED STATES PATENT AND TRADEMARK OFFICE
CERTIFICATE OF CORRECTION

| | | |
|---|---|---|
| PATENT NO. | : 7,852,611 B2 | Page 1 of 1 |
| APPLICATION NO. | : 11/958678 | |
| DATED | : December 14, 2010 | |
| INVENTOR(S) | : Tan | |

It is certified that error appears in the above-identified patent and that said Letters Patent is hereby corrected as shown below:

In Column 3, Line 7, delete "metalli7ed" and insert -- metallized --, therefor.

In Column 3, Line 28, delete "100 F." and insert -- 100 µF. --, therefor.

In Column 5, Line 9, Claim 5, after "capacitor" delete "system".

In Column 5, Line 23, in Claim 10, after "manufacturing" delete "a".

Signed and Sealed this
Seventh Day of June, 2011

David J. Kappos
*Director of the United States Patent and Trademark Office*